(12) United States Patent
Raja

(10) Patent No.: US 12,364,642 B2
(45) Date of Patent: Jul. 22, 2025

(54) ELECTRIC WALKING ASSISTING VEHICLE

(71) Applicant: SUZUKI MOTOR CORPORATION, Hamamatsu (JP)

(72) Inventor: Gopinath Raja, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 812 days.

(21) Appl. No.: 17/573,771

(22) Filed: Jan. 12, 2022

(65) Prior Publication Data

US 2022/0218555 A1    Jul. 14, 2022

(30) Foreign Application Priority Data

Jan. 14, 2021 (JP) ................. 2021-004217

(51) Int. Cl.
    *A61H 3/04*            (2006.01)

(52) U.S. Cl.
    CPC ......... *A61H 3/04* (2013.01); *A61H 2003/043* (2013.01); *A61H 2003/046* (2013.01);
    (Continued)

(58) Field of Classification Search
    CPC ................ A61H 3/04; A61H 2003/043; A61H 2003/046; A61H 2201/1207;
    (Continued)

(56) References Cited

U.S. PATENT DOCUMENTS

2017/0129523 A1    5/2017    Hane et al.
2020/0352815 A1    11/2020    Gopinath

FOREIGN PATENT DOCUMENTS

EP      3205322 A1 *    8/2017    ............... A61H 3/04
EP      3308761 A1    4/2018
    (Continued)

OTHER PUBLICATIONS

Extended European Search Report issued in International Application No. 21212449.9 on Jun. 9, 2022.
(Continued)

*Primary Examiner* — Jacob D Knutson
*Assistant Examiner* — Mohamed M Medani
(74) *Attorney, Agent, or Firm* — TROUTMAN PEPPER LOCKE LLP

(57) ABSTRACT

The electric walking assisting vehicle includes a vehicle body; left and right driving wheels; left and right motors operable to individually transmit power to the left and right driving wheels; gripping parts provided in an upper portion of the vehicle body and can be gripped by a user in a standing and walking posture; an electromagnetic brake for locking the left and right driving wheels or the left and right motors; a forcible release for the electromagnetic brake; an inclination sensor detecting an inclination of the vehicle body; and a control unit controlling the left and right motors, and during stopping of the left and right motors, when the inclination detected by the inclination sensor is less than a predetermined threshold value, the forcible releasing means for the electromagnetic brake is enabled and when the inclination is the predetermined threshold value or more, the forcible releasing means is disabled.

4 Claims, 7 Drawing Sheets

(52) U.S. Cl.
CPC ............... *A61H 2201/1207* (2013.01); *A61H 2201/1633* (2013.01); *A61H 2201/1635* (2013.01); *A61H 2201/5058* (2013.01); *A61H 2201/5069* (2013.01); *A61H 2203/0406* (2013.01); *A61H 2203/0431* (2013.01)

(58) Field of Classification Search
CPC .... A61H 2201/1633; A61H 2201/1635; A61H 2201/5058; A61H 2201/5069; A61H 2203/0406; A61H 2203/0431
USPC ...................................................... 180/6.48
See application file for complete search history.

(56) References Cited

FOREIGN PATENT DOCUMENTS

| | | | | | |
|---|---|---|---|---|---|
| EP | 4082509 | A1 | * | 11/2022 | ............... A61H 3/04 |
| JP | 4505694 | B2 | * | 7/2010 | |
| JP | 2016187485 | A | * | 11/2016 | ............... A61H 3/04 |
| JP | 2018061615 | A | * | 4/2018 | ............... A61H 3/04 |
| KR | 20130117602 | A | | 10/2013 | |
| KR | 20190133838 | A | | 12/2019 | |
| WO | 2016013534 | A1 | | 1/2016 | |
| WO | WO-2016031262 | A1 | * | 3/2016 | ............... A61H 3/04 |
| WO | 2016/158558 | A1 | | 10/2016 | |

OTHER PUBLICATIONS

Office Action issued on May 21, 2024 in counterpart JP Application No. 2021-004217 (including machine translation).

* cited by examiner

ELECTRIC WALKING ASSISTING VEHICLE

CROSS REFERENCE TO RELATED APPLICATION

The present application claims priority of Japanese Patent Application No. 2021-004217 filed Jan. 14, 2021. The entire contents of which are hereby incorporated by reference.

TECHNICAL FIELD

The present invention relates to an electric walking assisting vehicle.

BACKGROUND

Compact electric vehicles such as push cart-type electric walking assisting vehicles and electric wheelchairs for users having a difficulty walking, such as the elderly, have been publicly known. For example, JP 4505694 discloses an electric vehicle which includes an electromagnetic brake for locking a motor shaft and is operable to release locking of the electromagnetic brake by operating a hand-push switch in order to enable hand-push traveling upon storing the electric vehicle into a narrow garage or the like.

SUMMARY

In the electric vehicle disclosed in JP 4505694 B2, upon hand-push traveling, locking of the electromagnetic brake is released and motors are made to be in a dynamic braking state. However, even if resistance can be imparted to self-weight traveling toward a downward inclination direction by this braking force, the electric vehicle cannot be stopped. Moreover, since once the electric vehicle starts moving, a dynamic braking force decreases, it is likely that the electric vehicle will idly travels.

In view of the abovementioned problem, the present invention has been made. An object of the present invention is to prevent idle traveling upon hand-push traveling in a state in which motors of an electric walking assisting vehicle are stopped.

To solve the abovementioned problem, an electric walking assisting vehicle according to the present invention includes: a vehicle body having a forward-backward direction and a width direction; left and right driving wheels provided spaced apart in the width direction of the vehicle body; left and right motors connected so as to respectively transmit power to the left and right driving wheels; a gripping part for detecting that the gripping part is gripped to be gripped by a user in a standing and walking posture; an electromagnetic brake for locking the left and right driving wheels or the left and right motors; forcible releasing means for the electromagnetic brake; an inclination sensor for detecting an inclination of the vehicle body; and a control unit for controlling the left and right motors, and the control unit is configured such that during stopping of the left and right motors, when the inclination being detected by the inclination sensor is less than a predetermined threshold value, the control unit enables the forcible releasing means for the electromagnetic brake and when the inclination is the predetermined threshold value or more, the control unit disables the forcible releasing means.

As described above, since the electric walking assisting vehicle according to the present invention is configured such that only when the inclination is less than the predetermined threshold value, the forcible releasing means for the electromagnetic brake is enabled and when the inclination is the predetermined threshold value or more, the forcible releasing means is disabled, when the inclination is the predetermined threshold value or more, the electromagnetic brake is maintained in a locked state, and idle traveling on a slope due to self-weight can be reliably prevented. On the other hand, when the inclination is less than the predetermined threshold value, locking of the electromagnetic brake is released, and moving thereof by hand-pushing can be made without braking resistance.

DETAILED DESCRIPTION

Hereinafter, an Embodiment of the present invention will be described in detail with reference to the accompanying drawings.

Figure 1:
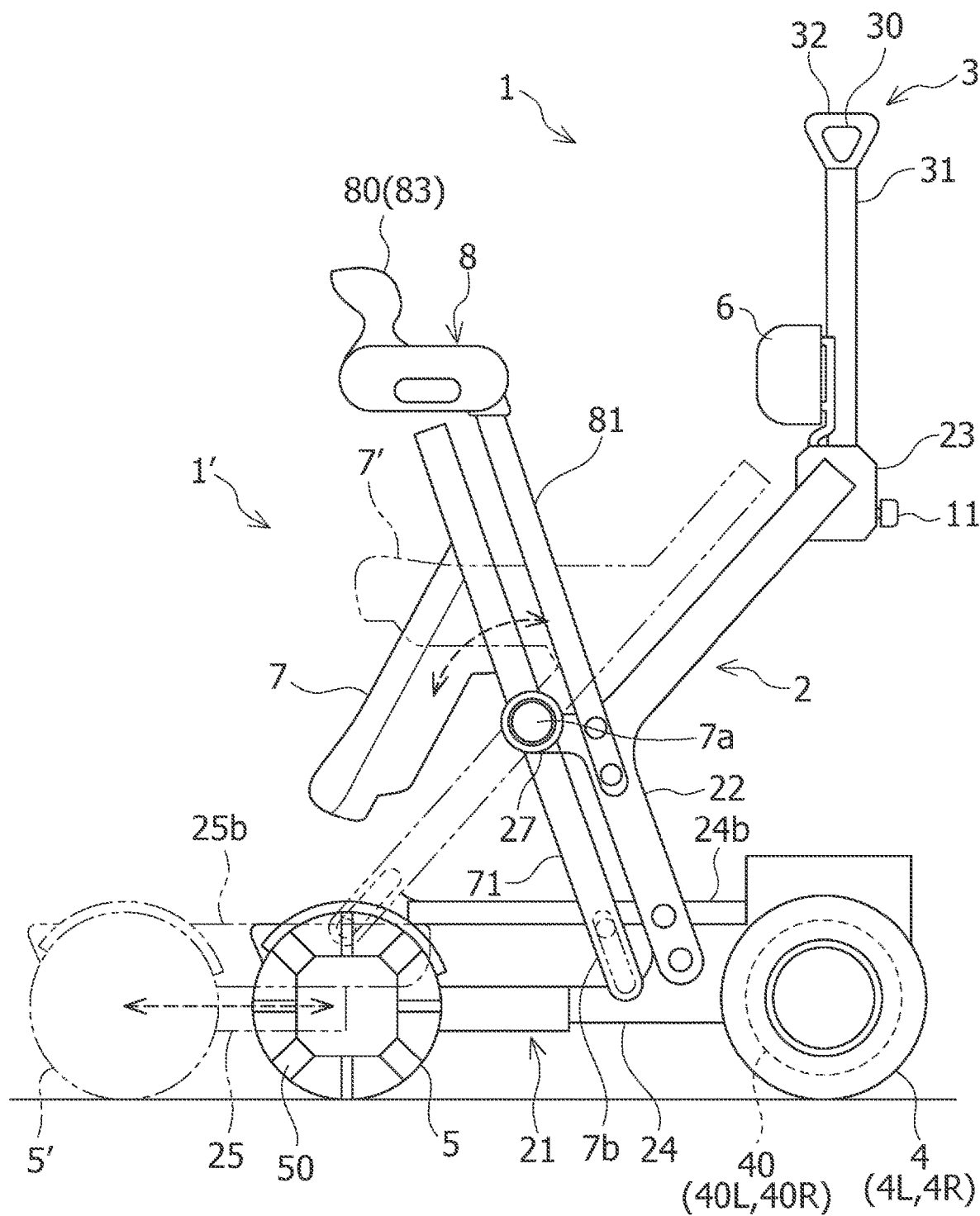
FIG. 1 is a side view showing an electric walking assisting vehicle according to an Embodiment.

In FIG. 1, an electric vehicle 1 according to the Embodiment of the present invention includes a vehicle body 2, which is constituted of a moving base 21 (lower traveling body) and an upper frame 22 which is installed in a standing manner in the rear of the moving base 21 (a rear side base 24), and can be utilized in a walking assisting vehicle mode (1) indicated by a solid line in FIG. 1 and a compact electric vehicle mode (riding mode 1') indicated by a two-dot chain line in FIG. 1.

The moving base 21 includes the rear side base 24 (main body part) which is provided with left and right driving wheels 4 (rear wheels) and the upper frame 22 and a front side base 25 which is provided with left and right driven wheels 5 (front wheels), the front side base 25 is coupled to a front side of the rear side base 24 in a manner slidable in a front-rear direction, and a wheel base of the moving base 21 is configured in such a way as to be extendable and contractible.

The left and right driving wheels 4 are independently driven by left and right motor units 40 (40L and 40R) which are mounted on the rear side base 24. The left and right driven wheels 5 are constituted of universal wheels (omniwheels or omnidirectional wheels), each of which includes, in a treading portion thereof, multiple rollers 50 which can rotate around an axis in a circumferential direction. The electric vehicle 1, as described later, can be steered, driven, and braked only by controlling the left and right motor units 40L and 40R.

The upper frame 22 is of an inverse U-shape or a gate shape in which upper ends of a pair of left and right side part frames installed in a standing manner upward from both left and right side parts of the rear side base 24 are joined by an upper end frame extending in a vehicle width direction, a lower end portion of a stem 31 of a rear handle 3 is rigidly coupled to a joining part 23 in a central portion of the upper end frame in the vehicle width direction, and a seat back 6 is supported on the joining part 23.

The rear handle 3 is of a T-bar shape and has a pair of left and right gripping parts which extend from a connecting part 32 with the upper end of the stem 31. The left and right gripping parts of the rear handle 3 are provided with a gripping sensor 30 which detects a state in which a user (or a helper) grips the gripping parts (hands-on). As the gripping sensor 30, a touch sensor such as a capacitance sensor and a pressure sensor can be used. In a case in which the user himself or herself uses the left and right gripping parts of the rear handle 3 in the walking assisting vehicle mode (1) and a case in which a helper or the like steers the electric vehicle with the user seated on a seat 7, the left and right gripping parts thereof serve as an operation part.

In a bending portion of the upper frame 22 (side part frame) in the middle of a height direction, a base part of a support frame 81 of an armrest 8 is fixed. A front end part of the armrest 8 on a right side, which is a depth side in FIG. 1, is provided with a riding mode operation unit 83, and a front end part of the armrest 8 on a left side, which is a front side in FIG. 1, is provided with a display part 80 on an upper surface of the gripping parts (83) having the same shapes. The riding mode operation unit 83 is configured by a biaxial joystick, which is tiltable in a front-rear direction and a left-right direction, or the like.

Whereas a support frame 71 of the seat 7 (seat cushion) is pivotably supported to a pivotal supporting part 27, which protrudes forward from the bending portion of the upper frame 22 (side part frame), by a shaft 7a in the vehicle width direction, a lower end of the support frame 71 is coupled to the front side base 25 (pin) via a coupling part 7b (slot) in a pivotable and slidable manner.

By the above-described configuration, when the seat 7 in a folding position is rotated rearward and upward from in the walking assisting vehicle mode (1) indicated by a solid line in FIG. 1 and is thereby moved to a seating position 7' as indicated by a two-dot chain line in FIG. 1, in conjunction therewith, the front side base 25 slides forward, the moving base 21 is extended, and the riding mode (1') is set. In this state, an upper surface 25b of the front side base 25, which has moved to a front side of a tray 24b, can be used as a footrest for a passenger.

Conversely, when the seat 7 is rotated frontward and downward from the riding mode (1') and is thereby moved to the folding position, the front side base 25 slides backward, the moving base 21 is shortened, and the walking assisting vehicle mode (1) in which the user can grip and operate the rear handle 3 while standing and walking is set.

Figure 2:
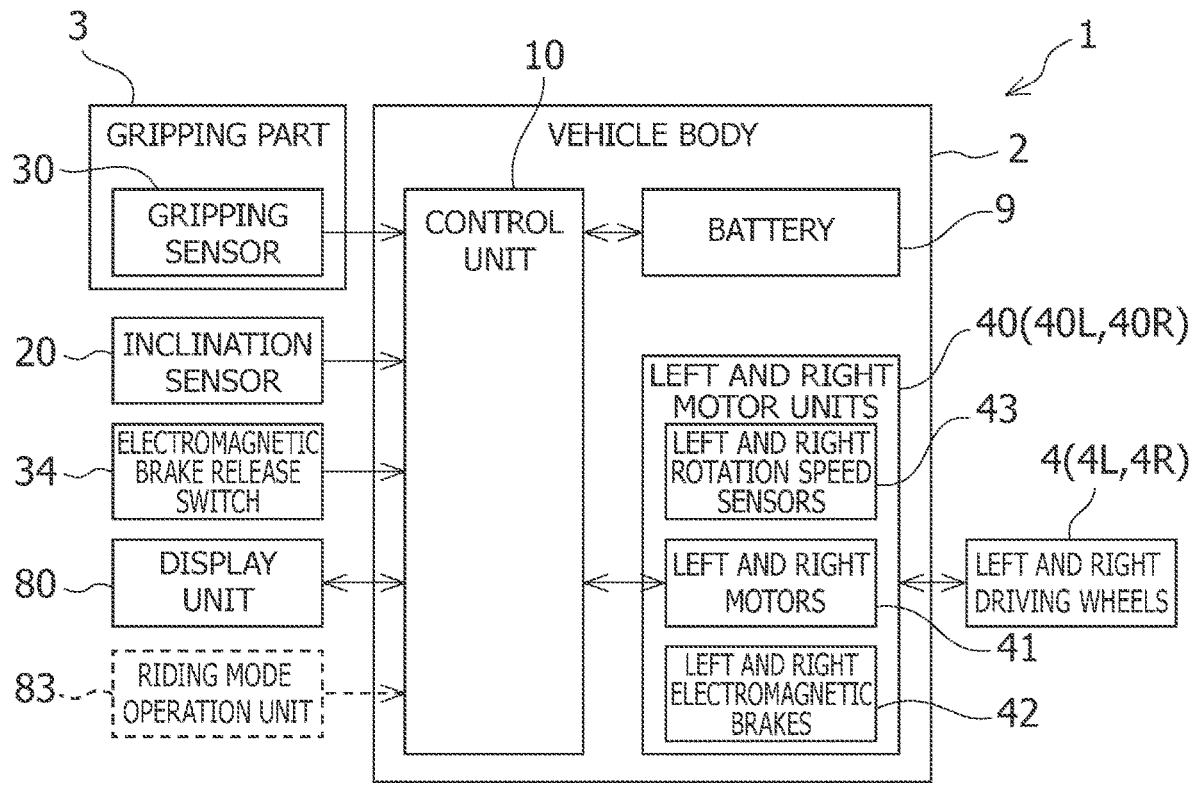
FIG. 2 is a block diagram showing a control system of the electric walking assisting vehicle according to the Embodiment.

FIG. 2 is a block diagram showing a control system of the electric vehicle 1. The electric vehicle 1 includes a battery 9 which supplies electric power to the left and right motor units 40 (40L and 40R) and a control unit 10 for controlling the left and right motor units 40 (40L and 40R), and the control unit 10 includes an interlock mechanism which implements control corresponding to the walking assisting vehicle mode (1) and control corresponding to the riding mode (1').

In the walking assisting vehicle mode (1), the riding mode operation unit 83 is disabled, and based on detection information detected by an inclination sensor 20, left and right speed sensors 43, and the like and a previously set control map, the control unit 10 executes control of the left and right motor units 40 (40L and 40R). The gripping sensor 30 detects only gripping (hands-on/hands-off) of the rear handle 3 by the user and is not involved in torque control of the motor units 40.

On the other hand, in the riding mode (1'), the gripping sensor 30 is disabled, and based on an operation of the riding mode operation unit 83 and detection information detected by the inclination sensor 20, the control unit 10 executes control of the left and right motor units 40 (40L and 40R).

The control unit 10 is constituted of: a computer (microcomputer) which includes ROM having stored therein programs and data for executing the control in the abovementioned modes, RAM which temporarily stores an arithmetic processing result, a CPU which performs arithmetic processing, and the like; a driving circuit (motor driver) for left and right motors 41; a power supply circuit including a relay which turns on/off the electric power of the battery 9; and the like.

Each of the left and right motor units 40 (40L and 40R) includes a motor 41, an electromagnetic brake 42 for locking a rotor of the motor 41, and a rotation position sensor (43) for detecting a rotation position of the motor 41, and a driving shaft of the motor 41 is connected to each of driving wheels 4 (4L and 4R) via a deceleration gear, not shown, so as to be operable to transmit power thereto.

In the present Embodiment, each of the left and right motors 41 is constituted of a brushless DC motor which switches a current of each phase coil by a driving circuit so as to match each phase of the rotor, which is detected by the rotation position sensor (43), and as described later, in the walking assisting vehicle mode (1), a rotation position sensor (Hall sensor) is used as a rotation speed sensor 43.

In addition, the driving circuit of each of the left and right motors 41 includes a current sensor for detecting a coil current. This coil current corresponds to torque of each of the left and right motors 41, and the control unit 10 controls the coil current, thereby executing torque control of the left and right motors 41.

As the electromagnetic brake 42, a negative actuated type electromagnetic brake, which locks the driving shafts of the motors 41 in a non-excited state and unlocks the driving shafts thereof in an excited state, is suitable. By employing the negative actuated type electromagnetic brake, the electric vehicle 1 can be reliably stopped upon key-off or during stopping without consuming electric power.

On the other hand, in a case of urgency or at the time of an emergency, for example, in a case in which it is desired that the electric vehicle 1 be moved without using power of the motors 41 or in a case in which traveling is impossible due to reduction in a battery remaining amount, in order to allow the electric vehicle 1 to be moved by releasing locking of the electromagnetic brake 42, as forcible releasing means for the electromagnetic brake 42, an electromagnetic brake release switch 34 is provided. Although the electromagnetic brake release switch 34 is provided, preferably, in such a way as to neighbor the gripping parts of the rear handle 3, irrespective of gripping detection by the gripping sensor 30, the electromagnetic brake release switch 34 can be operated.

As the electromagnetic brake release switch 34, a momentarily-operable release switch (for example, a push button switch) which releases locking of the electromagnetic brake 42 with a contact closed in a state in which the user operates the electromagnetic brake release switch 34 and locks the electromagnetic brake 42 with the contact opened when the user detaches his or her hand from the electromagnetic brake release switch 34 is suitable.

Thus, in a case in which while the electromagnetic brake 42 is released and the electric vehicle 1 is moving, the user's hand is detached from the electromagnetic brake release switch 34, the electromagnetic brake 42 is immediately locked and the electric vehicle 1 is prevented from idly traveling.

However, since when the electromagnetic brake 42 is released on a slope, it is likely that the electric vehicle 1 idly travels due to a self-weight in a period up to when the user's hand is detached from the electromagnetic brake release switch 34, in the electric vehicle 1, conditions of releasing the electromagnetic brake 42 are set as described below.
(Release Conditions of Electromagnetic Brake Based on Vehicle Body Inclination)

In a case in which during stopping of the motors 41, an inclination of the vehicle body 2 detected by the inclination sensor 20 is less than a predetermined threshold value (for example, ±four degrees), the control unit 10 enables operation of the electromagnetic brake release switch 34, and in a case in which the inclination of the vehicle body 2 is the predetermined threshold value or more, the control unit 10 disables the operation of the electromagnetic brake release switch 34.

After the electromagnetic brake 42 has been released by the operation of the electromagnetic brake release switch 34, even when the inclination of the vehicle body 2 detected by the inclination sensor 20 is the predetermined threshold value (for example, four degrees) or more, the control unit 10 does not immediately disable the operation of the electromagnetic brake release switch 34 until a predetermined period of time (for example, five seconds) has elapsed.

By setting the predetermined period of time (postponement time) as described above, in a case in which while the electromagnetic brake 42 is released and the electric vehicle 1 is moving by hand-pushing, the front wheels (5) or the rear wheels (4) are lifted up to climb over a step difference or to descend the step difference, even when the vehicle body 2 is temporarily inclined, the electromagnetic brake 42 can be prevented from being immediately locked. This postponement time may be configured in such a way as to allow the user to set the postponement time (in consideration of an assumed usage form).

On the other hand, in a case in which a state in which the inclination of the vehicle body 2 detected by the inclination sensor 20 is the predetermined threshold value (for example, ±four degrees) or more is continuously detected for a predetermined period of time (for example, five seconds) or more, the control unit 10 disables the operation of the electromagnetic brake release switch 34 and locks the electromagnetic brake 42.

Note that although since, in the electric vehicle 1 of the present embodiment, the front wheels are universal wheels 5, it is preferable that determination be made based on an inclination (corresponding to a road surface inclination) which is obtained from a front-rear direction inclination θp and a lateral inclination θr of the vehicle body 2, because an inclination threshold value is relatively small, in a case in which any of the front-rear direction inclination θp or the lateral inclination θr is the predetermined threshold value or more, the determination of the inclination threshold value or more may be made. In addition, a threshold value of the front-rear direction inclination θp and a threshold value of the lateral inclination θr can also be separately set.

The control unit 10 disables the operation of the electromagnetic brake release switch 34 during driving of the motors 41, and during stopping of the motors 41 and in a case in which a rotation speed detected by the rotation speed sensors 43 is less than a predetermined threshold value, that is, only in a case in which the vehicle speed is less than a predetermined threshold value (for example, ±0.1 km/h) which can be practically presumed to be zero, the control unit 10 enables the operation of the electromagnetic brake release switch 34.

In a case in which after the electromagnetic brake 42 has been released by the operation of the electromagnetic brake release switch 34, the rotation speed detected by the rotation speed sensors 43 has reached an upper limit value, that is, in a case in which the vehicle speed has reached a predetermined upper limit value (for example, four km/h), the control unit 10 disables the operation of the electromagnetic brake release switch 34 and locks the electromagnetic brake 42.

In the walking assist (or a hard running state) by operation of the motors 41, a speed of the electric vehicle 1 is controlled to be less than an upper limit (for example, six km/h) in a standard walking speed range of an assumed user by the below-described control. However, by setting an upper limit speed upon forcibly releasing the electromagnetic brake to be a value (for example, four km/h) smaller than the abovementioned upper limit, the speed thereof can be reliably made to fall within the upper limit speed range at the time when the electric vehicle 1 is moving by hand-pushing. As described above, the forcible release of the electromagnetic brake 42 by the electromagnetic brake release switch 34 presupposes use for a purpose of temporarily moving the electric vehicle 1 in a case of urgency, at the time of an emergency, or the like.

The inclination sensor 20 is mounted on a circuit board of the control unit 10 which is mounted inside the moving base 21 (rear side base 24) of the vehicle body 2, and a biaxial inclination sensor for detecting inclination of the vehicle body 2 in a front-rear direction and a lateral direction, an acceleration sensor, or a multiaxial inertial sensor in which an acceleration sensor and an angular acceleration sensor (gyroscope sensor) are integrated can be used.

The electric vehicle 1 configured as described above is, in the walking assisting vehicle mode (1), operable to perform torque assist in all operations of forward moving/backward moving/turning by generating torque in the left and right motor units 40 (40L and 40R) in accordance with rotation speeds of the left and right driving wheels 4L and 4R, which are detected by the left and right rotation speed sensors 43, in conjunction with operations of pushing/pulling the vehicle body 2 in a state in which the user grips the rear handle 3.

First, basic control in the walking assisting vehicle mode (1) will be described by assuming forward moving/backward moving on a flat road.

Figure 3:
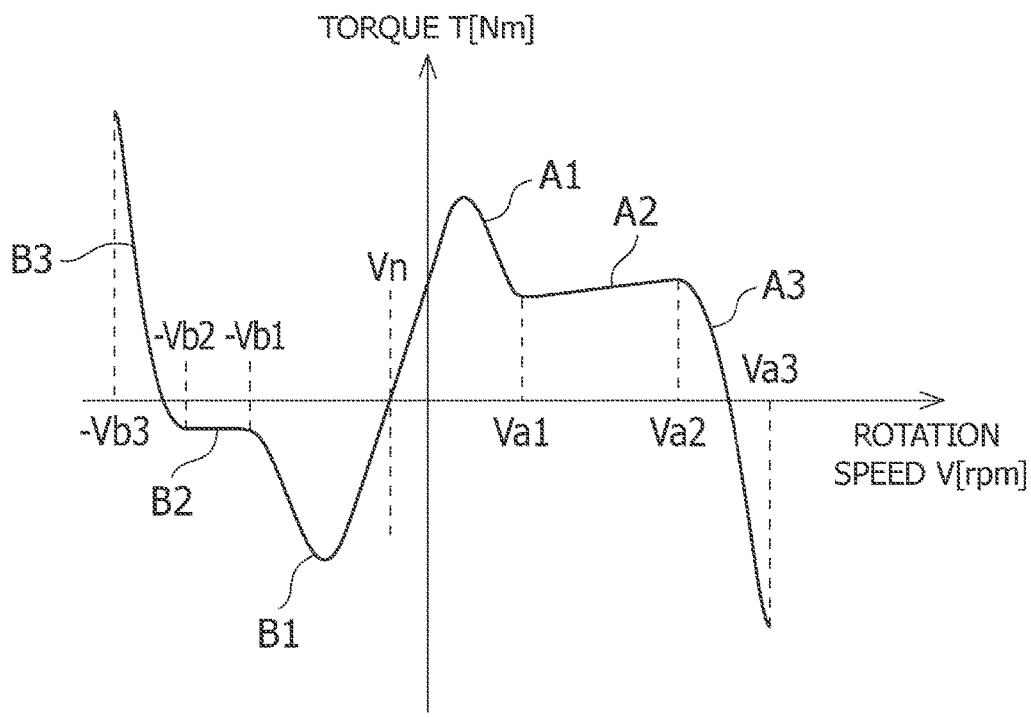
FIG. 3 is a basic torque map for controlling the electric walking assisting vehicle according to the Embodiment.

FIG. 3 shows a basic torque map which defines relationship between a rotation speed V detected by each of the left and right rotation speed sensors 43 and a torque T command value of each of the left and right motors 41. As already described, in the present Embodiment, as the left and right rotation speed sensors 43, the rotation position sensors of the left and right motors 41 are used, and a rotation speed of each of the left and right driving wheels 4L and 4R is detected as the rotation speed V of each of the left and right motors 41 (rotors), which is increased by a gear ratio of the deceleration gear.

For example, in a case in which each of the left and right motors 41 is a three-phase brushless DC motor, up to ⅙ rotation of 60 degrees can be detected by three rotation position sensors (43) which are arranged at intervals of 120 degrees, and since when the gear ratio of the deceleration gear is 10:1 and each of the left and right driving wheels 4L and 4R rotates at 36 degrees, each of the left and right motors 41 (rotors) makes one rotation, as the rotation speed of each of the left and right motors 41 (rotors) or a number of revolutions [rpm] per unit time, practically sufficient resolution can be obtained.

A basic operation in the walking assisting vehicle mode (1) is an operation of moving forward in a state in which the user grips the rear handle 3. In the basic torque map shown in FIG. 3, an operation origin Vn (neutral point) is set on a slightly negative side of the rotation speed V in order for the electric vehicle 1 not to move backward by initial rotation to a negative side (front side) in conjunction with an operation of gripping the rear handle 3 by the user.

By this configuration, even when the initial rotation to the negative side, made by the operation of gripping the rear handle 3 by the user, is detected, within the rotation speed Vn of each of the left and right driving wheels 4L and 4R, assist torque in a forward moving direction is generated, and only in a case in which the user has clear intention and performs an operation of pulling the rear handle 3 (a case in which a rotation speed in a negative direction is greater than Vn), assist torque in a backward moving direction is generated.

In addition, the basic torque map shown in FIG. 3 has a peak region A1 (−Vn to +Va1) of a torque command value on a positive side of the operation origin Vn, which generates starting torque in the forward moving direction, and a peak region B1 (−Vn to −Vb1) of a torque command value on a negative side of the operation origin Vn, which generates starting torque in the backward moving direction.

By this configuration, in a state in which the electric vehicle 1 is stopping, immediately in response to an operation of gripping and pushing the rear handle 3 by the user, the torque assist is executed, and it is made possible to promptly start moving of the electric vehicle 1 and to cause the electric vehicle 1 to shift to steady forward traveling (A2). In addition, in response to an operation of pulling the rear handle 3 by the user, it is made possible to cause the electric vehicle 1 to promptly shift to steady backward traveling (B2).

Furthermore, the basic torque map shown in FIG. 3 has a steady torque region A2 (+Va1 to +Va2) in the forward moving direction, which is on a further positive side in the peak region A1 on the forward moving side and has a steady torque region B2 (−Vb1 to −Vb2) in the backward moving direction, which is on a further negative side in the peak region B1 on the backward moving side.

Although in order to compensate for frictional resistance which increases in accordance with a speed of the electric vehicle 1, the steady torque region A2 (+Va1 to +Va2) in the forward moving direction increases in accordance with the rotation speed V, it is intended that torque assist be executed in accordance with a standard walking speed of an assumed user by a torque command value in the neighborhood of rating of each of the left and right motors 41.

Although similar is applied also to the steady torque region B2 (−Vb1 to −Vb2) in the backward moving direction, because a walking speed during the backward moving is slow, as compared with a walking speed during the forward moving, it is preferable that a torque command value itself be less than that in the steady torque region A2 in the forward moving direction and an increasing rate of the torque command value in accordance with the rotation speed also be small, and the torque command value in the steady torque region B2 in an example shown in FIG. 3 is constant.

Furthermore, the basic torque map shown in FIG. 3 has a braking torque region A3 (+V2 to +V3) in the forward moving direction, which is on a further positive side in the steady torque region A2 on the forward moving side, and has a braking torque region B3 (−Vb2 to −Vb3) in the backward moving direction, which is on a further negative side in the steady torque region B2 on the backward moving side.

In the braking torque region A3 in the forward moving direction, a torque command value is decreased as a traveling speed of the electric vehicle 1 approaches an upper limit in a standard walking speed range of the assumed user (for example, 6 km/h), braking torque is further generated for the electric vehicle 1 by executing torque assist in a direction inverse to a traveling direction in the neighborhood of the upper limit in the assumed walking speed range, and a traveling speed of the electric vehicle 1 is controlled to fall within the assumed walking speed range.

Although the similar is applied also to the braking torque region B3 in the backward moving direction, because a walking speed during the backward moving is slow, as compared with a walking speed during the forward moving, braking torque of a lower rotation speed lower than a rotation speed on the forward moving side is generated. Note that the basic torque map is stored as a look-up table in an ROM area of the control unit 10.

As described hereinbefore, the torque command values in accordance with the peak region A1 (starting torque region), the steady torque region A2, and the braking torque region A3 in the forward moving direction are given by the basic torque map shown in FIG. 3, the operation of gripping and pushing the rear handle 3 by the user is thereby further promptly started and shifting to the steady torque region A2 is performed, and thereafter, by exceeding the steady torque region A2 and increasing the speed, the torque assist in a braking direction is executed in the braking torque region A3, and when deceleration to a value not greater than values in the steady torque region A2 is performed, the torque assist in a speed increasing direction is executed in the peak region A1. Therefore, the steady torque region A2 corresponding to the standard walking speed range (+Va1 to +Va2) is maintained only by the simple operation of gripping and pushing/pulling the rear handle 3 by the user without special awareness of the user, thus leading to advantages in that stable assist can be performed.

In addition, in the above-described torque assist control, increase and decrease of the rotation speed V by the operations of gripping and pushing/pulling the rear handle 3 by the user and increase and decrease of the rotation speed V by driving of the left and right motors 41 (torque assist) are not distinguished (it is not necessary to distinguish therebetween), and the torque assist is executed in accordance with the rotation speed V as a result of cooperative operations of the operation of gripping and pushing the rear handle 3 by the user and the operation by the driving force of the left and right motors 41. Therefore, not only a force sensor (pressure sensor or the like) which detects a direction and a magnitude of a force with which the user pushes/pulls the rear handle 3 is not necessary, but also the control is not influenced by variation in the direction and the magnitude of a detected force, thus leading to advantages in that a vehicle body structure and control are simplified.

(Turning Assist in Walking Assisting Vehicle Mode)

Next, a turning assist in the walking assisting vehicle mode (1) will be described with reference to FIGS. 6A to 6C.

As already described, in the electric vehicle 1, each of the motor units 40 (40L and 40R) of the left and right driving wheels 4L and 4R includes the rotation speed sensor 43, and in a case in which the operation of pushing/pulling the vehicle body 2 is performed with left and right forces which are different from each other in a state in which the user grips the rear handle 3 by left and right hands (or either one of the hands), a difference between rotation speeds of the left and right driving wheels 4L and 4R is caused.

Figure 6A:
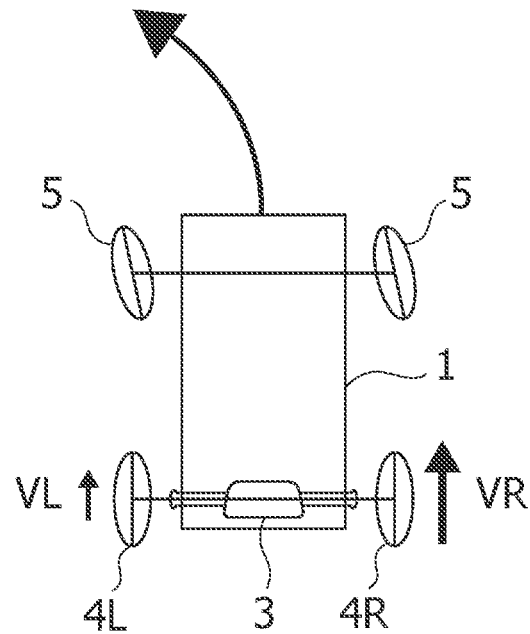
FIG. 6A is a schematic plan view showing a turning assist.
Figure 6B:
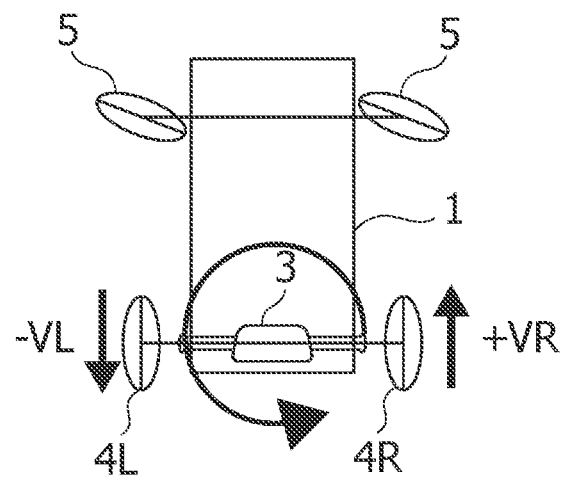
FIG. 6B is a schematic plan view showing a turning assist on the spot (spin turn)

For example, as shown in FIG. 6A, by relatively strongly pushing a right side of the rear handle 3, a rotation speed VR, which is greater than a rotation speed VL of the driving wheel 4L on a left side, is detected for the driving wheel 4R on the right side, and a rotation speed difference ΔV=VR-VL between the rotation speeds VR and VL detected by the left and right rotation speed sensors 43 is caused. Here, when the basic torque map shown in FIG. 3 is applied to control of the motor units 40 (40L and 40R) of the left and right driving wheels 4L and 4R as it is, even if a slight rotation speed difference is caused, the rotation speed difference is increased by left and right individual torque assists, the electric vehicle 1 turns, and stable forward moving/backward moving cannot thereby be performed.

Figure 6C:
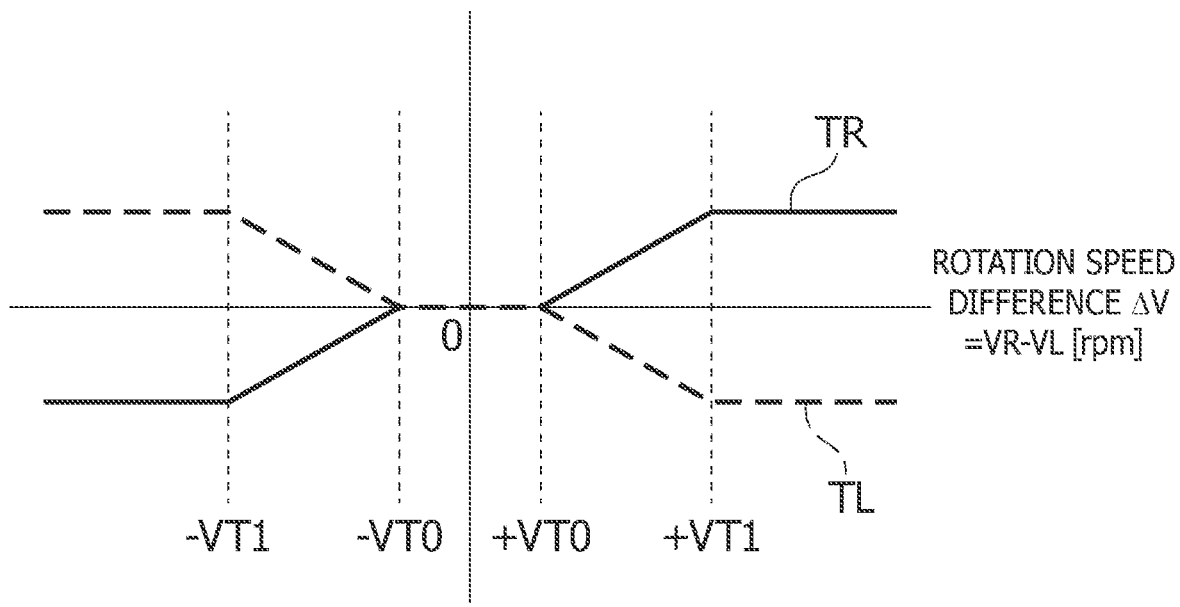
FIG. 6C shows an additional torque map at turning time.

Therefore, as shown in FIG. 6C, a torque assist in accordance with the rotation speed difference ΔV is executed as described below by a torque map which defines relationship between the rotation speed difference ΔV of the left and right driving wheels 4L and 4R and additional torque TL and TR, thereby allowing stable forward moving/backward moving assist and turning assist to be appropriately executed in accordance with circumstances. Note that as with the basic torque map, this additional torque map is also stored as a look-up table in the ROM area of the control unit 10.

(i) When the rotation speed difference ΔV of the left and right driving wheels 4L and 4R is less than a predetermined threshold value ±VT0, the rotation speed difference ΔV of the left and right driving wheels 4L and 4R is ignored, in accordance with the basic torque map in FIG. 3, torque of either one of the left and right rotation speeds VR and VL or torque, which is selected from mean values (average values) of the left and right rotation speeds VR and VL and is equal in principle, is generated in the left and right motor units 40 (40L and 40R), and the forward moving/backward moving assist is executed.

(ii) When the rotation speed difference ΔV of the left and right driving wheels 4L and 4R is equal to or greater than the predetermined threshold value ±VT0, turning assist control in which in accordance with the rotation speed difference ΔV, a torque command value of one of the motors, a rotation speed of which is greater than a rotation speed of another one of the motors, is increased and a torque command value of one of the motors, a rotation speed of which is less than a rotation speed of another one of the motors, is decreased is executed.

(iii) However, when the rotation speed difference ΔV of the left and right driving wheels 4L and 4R is equal to or greater than a second threshold value ±VT1, without increasing and decreasing the torque command values in accordance with the rotation speeds, turning assist control is executed by torque command values TL and TR which cope with the second threshold value ±VT1.

By performing the above-described turning assist control, steering resistance caused on the driven wheels 5 is compensated, light and reliable turning assist can be executed by an operation of pushing one side of the rear handle 3. In addition, as shown in FIG. 6B, a light and reliable turning (spin turn) assist on the spot can be executed by operations of pushing one side of the rear handle 3 and pulling the other side thereof.

(Uphill/Downhill Assist in Walking Assisting Vehicle Mode)

Figure 7A:
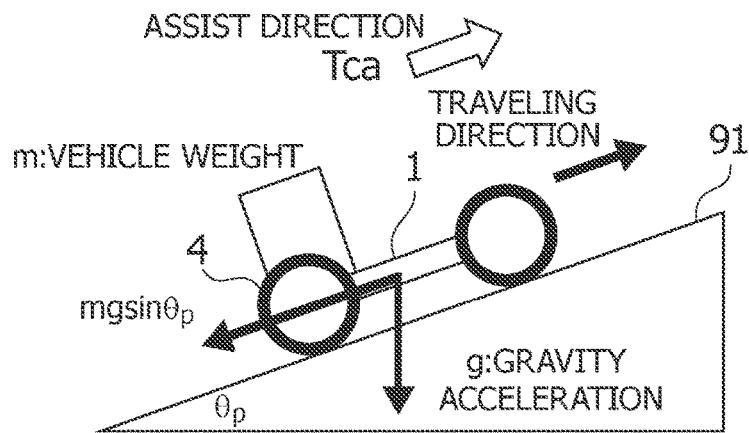
FIG. 7A is a schematic side view showing an upward inclination compensation assist.
Figure 7B:
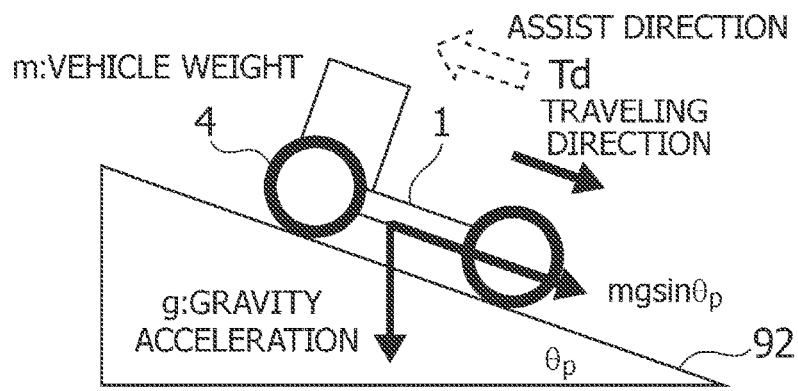
FIG. 7B is a schematic side view showing a downward inclination compensation assist.

Next, an uphill/downhill assist in the walking assisting vehicle mode (1) will be described with reference to FIGS. 7A to 7C.

In the description given hereinbefore, for the sake of convenience, the control on a flat road is described. However, on an uphill road 91 shown in FIG. 7A and a downhill road 92 shown in FIG. 7B, due to a gravity exerted on the vehicle body 2, loads (mg·sin θp) in a direction inverse to a traveling direction/a direction same as the traveling direction are caused in accordance with a vehicle weight m and an inclination θp.

Figure 7C:
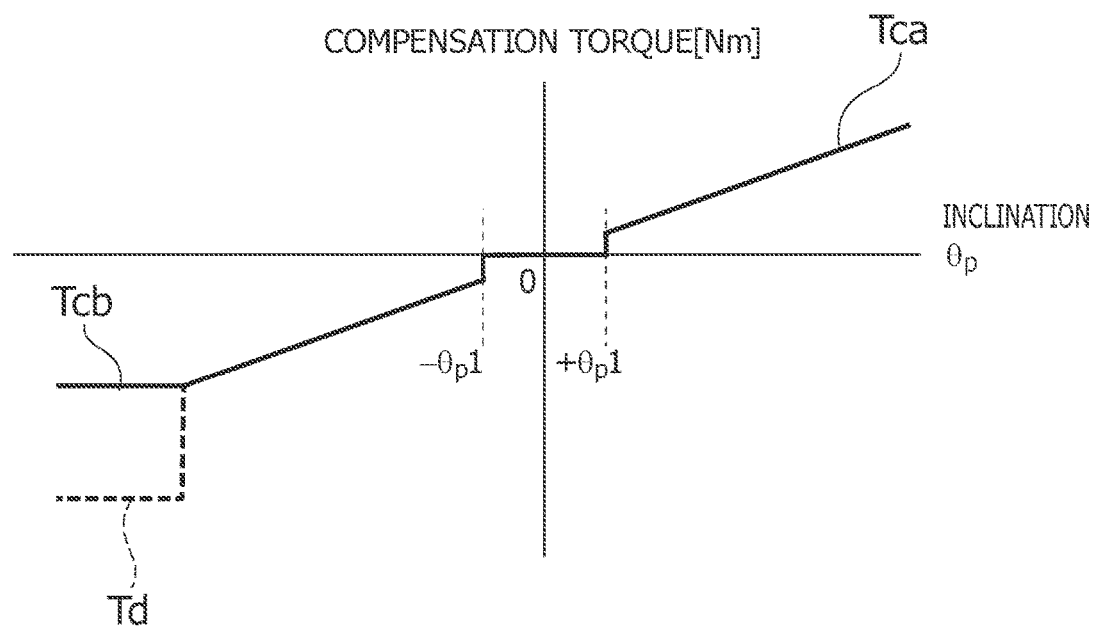
FIG. 7C shows a compensation torque map.

Therefore, on the uphill road 91 and the downhill road 92, a torque map shown in FIG. 7C is used in combination, and compensation torque Tca, Tcb, and Td which offset the loads caused in accordance with the inclination (angle) θp which is detected by the inclination sensor 20 are added to a torque command value. In other words, a compensation torque command value of the additional torque map is superimposed on a torque command value of the basic torque map. As with the basic torque map, this additional torque map is also stored as a look-up table in the ROM area of the control unit 10.

Note that a threshold value (less than ±θp1 and a dead zone) is set for the inclination θp, and in a case in which the inclination θp is less than the threshold value and no influence is exerted on the basic control and the turning control, the torque compensation is not performed.

(i) When the electric vehicle 1 goes up on the uphill road 91 having an inclination θp1 or more and moves forward, in order to offset a load in an inverse direction, which is weighted in accordance with the inclination θp of the uphill road 91, as indicated by a solid line on a right side of the torque map in FIG. 7C, compensation torque Tca in the same direction, which increases in proportion to the inclination θp of the uphill road 91 is added and an uphill assist is executed.

(ii) When the electric vehicle 1 goes down on the uphill road 91 having the inclination θp1 or more and moves downward, since a load in the same direction as a backward moving direction, which is weighted in accordance with the inclination θp of the uphill road 91, is caused, as indicated by a solid line on a left side of the torque map in FIG. 7C, compensation torque Tcb in an inverse direction (regeneration direction), which increases in proportion to the inclination θp of the uphill road 91 is added and a braking assist is executed.

(iii) When the electric vehicle 1 goes down on the downhill road 92 having the inclination θp1 or more and moves forward, since a load in the same direction as the traveling direction, which is weighted in accordance with the inclination θp of the downhill road 92, is caused, as indicated by a solid line and a broken line on the left side of the torque map in FIG. 7C, compensation torque Td in an inverse direction (regeneration direction), which increases in proportion to an inclination θp of the downhill road 92, is added and a braking assist is executed, similarly. However, when the inclination θp has reached a predetermined threshold value, predetermined braking torque is generated and braking control is executed.

(Lateral Inclination Compensation Assist in Walking Assisting Vehicle Mode)

Figure 8:
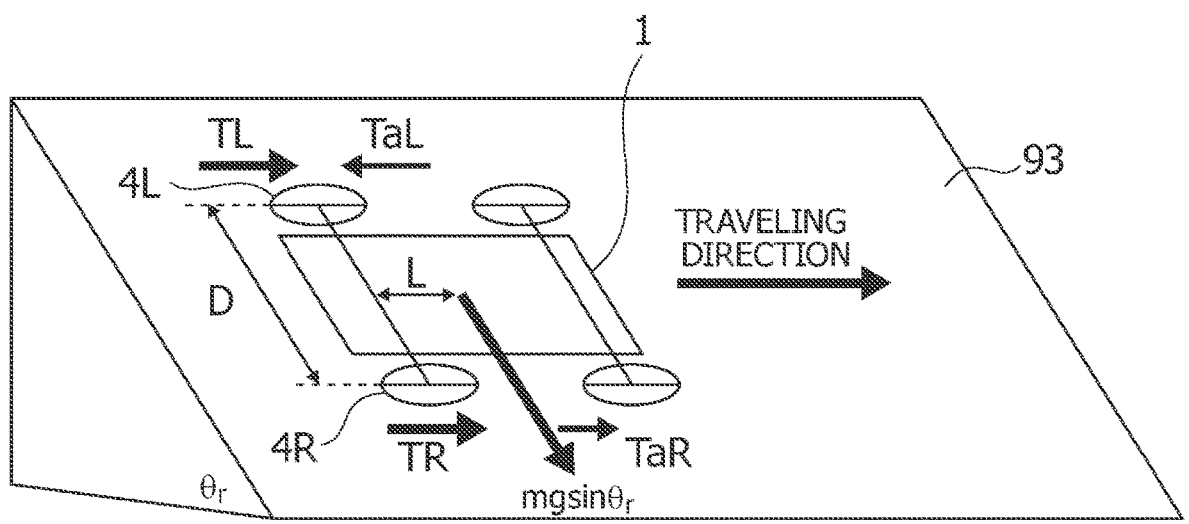
FIG. 8 is a schematic perspective view showing a lateral inclination compensation assist.

FIG. 8 shows a lateral inclination compensation assist in a case in which the electric vehicle 1 in the walking assisting vehicle mode (1) moves forward on a road surface 93 which has an inclination (lateral inclination θr) in a direction intersecting with a traveling direction of the electric vehicle 1 (or a case in which the electric vehicle 1 moves forward in a direction intersecting with the inclination θr of the slope 93).

In other words, in FIG. 8, in a case in which there is a center of gravity with a distance L which lies ahead with respect to an axle of the driving wheels 4L and 4R, a deflection moment (mg·sin θr·L) toward a downward direction of the lateral inclination θr is caused for the electric vehicle 1 by gravity mg acting on the center of gravity and the lateral inclination θr.

Therefore, in order to offset this deflection moment by assist torque by the motor units 40 (40L and 40R) of the left and right driving wheels 4L and 4R, compensation torque TaL and TaR in directions, which are inverse to each other, are added to the left and right motor units 40 (40L and 40R) so as to generate a couple of force which corresponds to a compensation moment with a center (D/2) of a tread width D as a center. When a radius of each of the driving wheels 4L and 4R is defined as r and a coefficient in consideration of traveling resistance of a road surface or the like is defined as 6, the compensation torque TaL and TaR coping with the lateral inclination θr can be given by the following formula.

$$TaL = TaR = δ·mg·\sin θr·Lr/D$$

Note that a threshold value (dead zone) is set also for the lateral inclination θr and in a case in which the lateral inclination θr is less than the threshold value and no influence is exerted on the basic control and the turning control, the lateral inclination compensation assist is not performed.

(Basic Control Flow in Walking Assisting Vehicle Mode)

When the electric vehicle 1 configured as described above is turned on by operating a key 11 and the system is activated, in accordance with a frame form when activated, the walking assisting vehicle mode (1) or the riding mode (1') is set. Note that as already described, in a state in which the electric vehicle 1 is stopping, the electromagnetic brake 42 is in a locked state.

Figure 4:
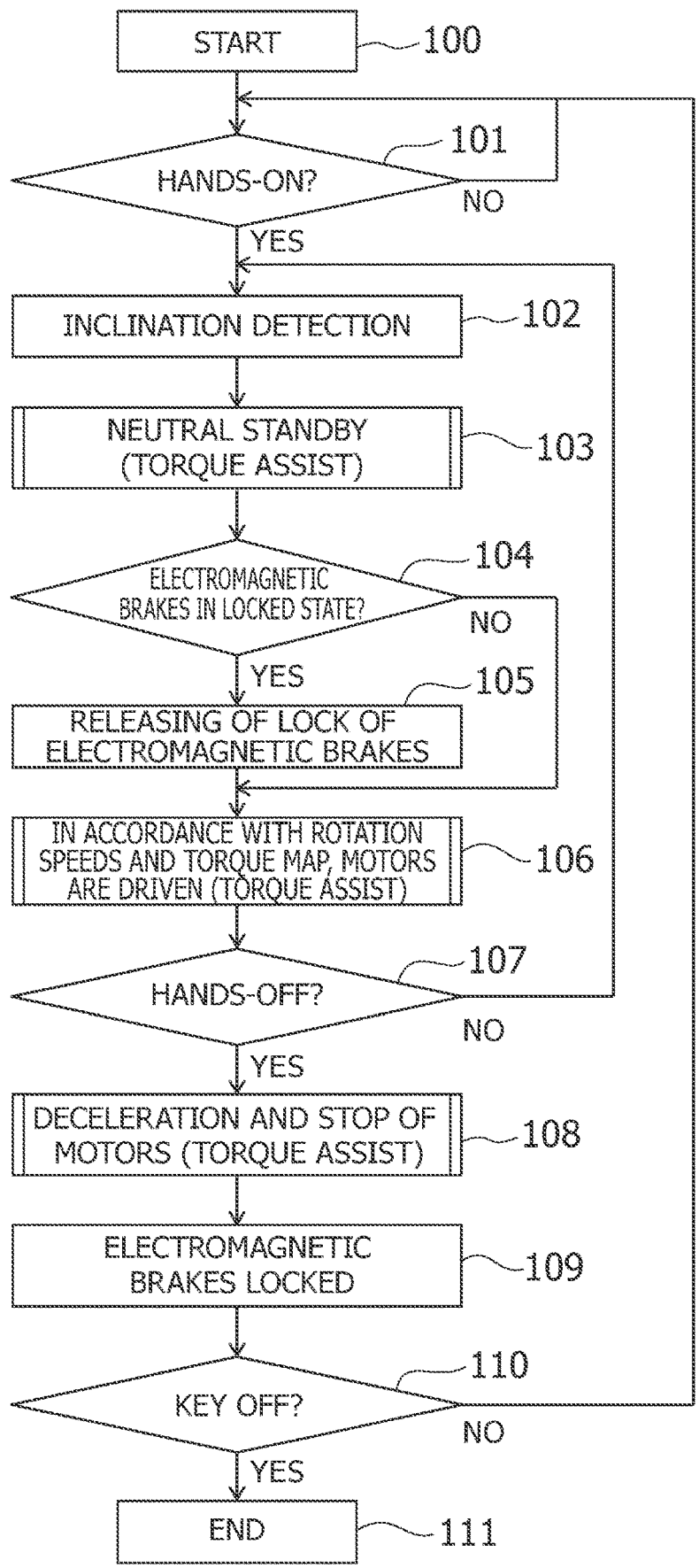
FIG. 4 is a flowchart showing basic control of the electric walking assisting vehicle according to the Embodiment.

Hereinafter, control in a case in which the walking assisting vehicle mode (1) is set when activated or the walking assisting vehicle mode (1) is set by an operation performed by the user in a state in which the electric vehicle 1 is stopping after activation will be described with reference to a flowchart in FIG. 4.

First, when the walking assisting vehicle mode (1) is set (step 100), the gripping sensor 30 is in an operation state. In this state, when the user grips the rear handle 3 and the gripping sensor 30 detects a gripping state (hands-on) (step 101), the inclination sensor 20 detects the inclination θp in the forward-backward direction of the vehicle body 2 and the inclination θr in a lateral direction (step 102).

When the inclination θp in the forward-backward direction and/or the inclination θr in the lateral direction are/is equal to or greater than the threshold value, torque assist in which the compensation torque Tca, Tcb, and Td and/or the compensation torque TaL and TaR are generated in the left and right motor units 40 (40L and 40R) is executed and in a neutral state in which initial torque in a forward moving direction is applied to the left and right driving wheels 4L and 4R, the electric vehicle 1 stands by (step 103).

Subsequently, it is checked whether or not the left and right electromagnetic brakes 42 are in a locked state (step 104), and when the left and right electromagnetic brakes 42 are in the locked state (at initial activation time or the like), lock of the left and right electromagnetic brakes 42 is released (step 105).

At this time, although the electric vehicle 1 is at rest, an external force resulting from the inclination is offset by compensation torque, and regardless of absence or presence of the inclination, the electric vehicle 1 is in an immediately movable state. In this state, the user performs the operation of pushing/pulling the rear handle 3, whereby the left and right driving wheels 4L and 4R are rotated, and when rotation speeds V (VL and VR) are detected by the rotation speed sensor 43, in accordance with the rotation speeds V (VL and VR) and the basic torque map, torque is generated in the left and right motor units 40 (40L and 40R), and the torque assist such as the forward moving/backward moving/turning is executed (step 106).

Also, while the electric vehicle 1 is traveling, detection of the gripping state (hands-on) by the gripping sensor 30 is continued (step 107), and when the gripping state comes not to be detected by the gripping sensor 30 and the control unit 10 determines hands-off, torque command values for the left and right motor units 40 (40L and 40R) are gradually decreased, and torque assist in which the electric vehicle 1 is decelerated and stopped is executed (step 108). Together therewith, after a lapse of predetermined time (for example, two seconds) from the hands-off, the left and right electromagnetic brakes 42 are locked (step 109).

In a state in which the left and right electromagnetic brakes 42 are locked, when an operation of turning off the key 11 is detected (step 110), electric power supply to the left and right motor units 40 (40L and 40R) is stopped and thereafter, the system is shut down (step 111).

(Electromagnetic Brake Release Control Flow)

Figure 5:
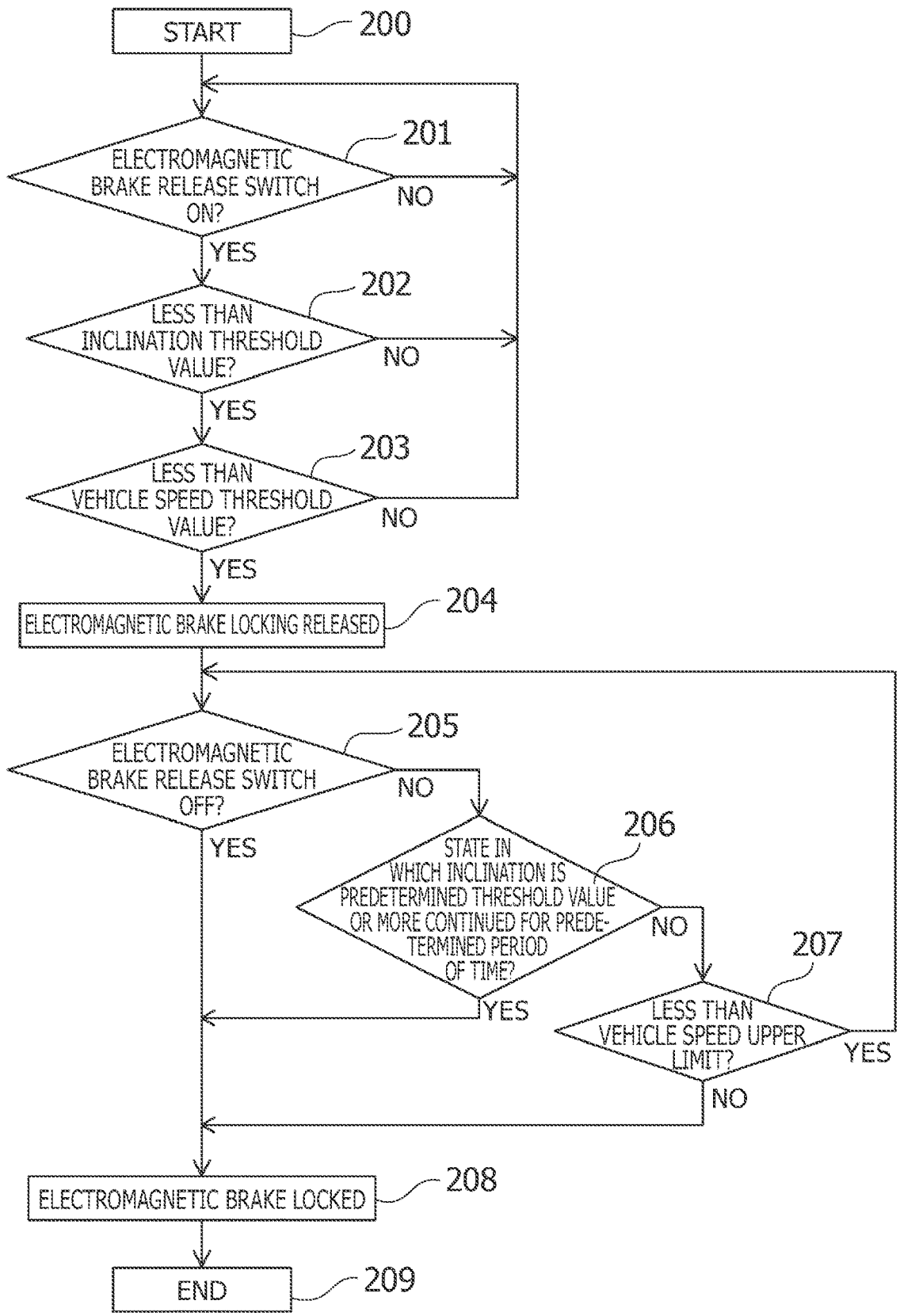
FIG. 5 is a flowchart showing electromagnetic brake release control of the electric walking assisting vehicle according to the Embodiment.

Next, control in a case in which in a case of urgency, at the time of emergency, or the like, the electric vehicle 1 is moved by hand-pushing will be described with reference to a flowchart in FIG. 5.

In a walking assisting vehicle mode (1) or a riding mode (1'), in a case in which in a state in which the motors 41 are stopped, the electromagnetic brake release switch 34 is turned on (step 201), it is detected whether or not the inclination of the vehicle body 2 detected by the inclination sensor 20 is less than the predetermined threshold value (for example, ±four degrees) (step 202), and furthermore, it is detected whether or not the vehicle speed detected by the rotation speed sensors 43 is less than the predetermined threshold value (for example, 0.1 km/h) (step 203).

In the case in which the inclination of the vehicle body 2 detected by the inclination sensor 20 is the predetermined threshold value or more or the vehicle speed detected by the rotation speed sensors 43 is the predetermined threshold value or more, the operation of the electromagnetic brake release switch 34 is disabled and the electromagnetic brake 42 is maintained in a locked state.

Only in a case in which in a state in which the electromagnetic brake release switch 34 is turned on, the inclination of the vehicle body 2 detected by the inclination sensor 20 is less than the predetermined threshold value and the vehicle speed detected by the rotation speed sensors 43 is less than the predetermined threshold value, locking of the electromagnetic brake 42 is released by the operation of the electromagnetic brake release switch 34 (step 204), thereby making the electric vehicle 1 movable.

After the locking of the electromagnetic brake 42 has been released, in step 205, when for example, the user's hand is detached from the electromagnetic brake release switch 34, the electromagnetic brake 42 is immediately locked (step 208).

On the other hand, even in the state in which the electromagnetic brake release switch 34 is turned on, in a case in which detection of the inclination of the vehicle body 2 by the inclination sensor 20 and detection of the vehicle speed by the rotation speed sensors 43 are continued and a state in which the inclination detected by the inclination sensor 20 is the predetermined threshold value or more is continuously detected for the predetermined period of time (for example, five seconds) or more (step 206), or in a case in which the vehicle speed detected by the rotation speed sensors 43 has reached the predetermined threshold value (step 207), the electromagnetic brake 42 is immediately locked (step 208).

In addition, even when the inclination, which is the predetermined threshold value or more, is detected by the inclination sensor 20, in a case in which such state is continued for a period less than the predetermined period of time (for example, five seconds), the electromagnetic brake 42 is maintained in a released state. Therefore, while the electric vehicle 1 is moving by hand-pushing, it is made possible to climb over the step difference or to descend the step difference by lifting up the front wheels or the rear wheels.

Hereinbefore, the Embodiment of the present invention is described. However, the present invention is not limited to the above-described Embodiment, and a variety of variations and modifications of the present invention can be further made based on the technical concept of the present invention.

For example, although in the Embodiment described above, the case in which the electric walking assisting vehicle 1 includes the compact electric vehicle mode (riding mode) is described, the present invention can be implemented as an electric walking assisting vehicle including no riding mode.

In addition, although in the Embodiment described above, the case in which as the driven wheels 5, the omni-wheels are used is described, caster-type universal wheels can also be used.

The invention claimed is:

1. An electric walking assisting vehicle comprising:
a vehicle body having a forward-backward direction and a width direction;
left and right driving wheels provided spaced apart in the width direction of the vehicle body;
left and right motors connected so as to respectively transmit power to the left and right driving wheels;
rotation speed sensors which individually detect rotation speeds of the left and right driving wheels;
a gripping part to be gripped by a user in a standing and walking posture;
a gripping sensor detecting that the gripping part is gripped by the user;
an electromagnetic brake for locking the left and right driving wheels or the left and right motors in a state in which the vehicle is stopped, the electromagnetic brake being locked in a non-excited state, and being unlocked in an excited state when power is supplied to the electromagnetic brake;
forcible release releasing the electromagnetic brake, the forcible release including a user operable release switch, the power being supplied to the electromagnetic brake in a state in which the release switch is operated, thereby unlocking the electromagnetic brake;
an inclination sensor detecting an inclination of the vehicle body; and
a control unit controlling the left and right motors,
wherein the control unit is configured such that:
in a state in which the gripping sensor detects gripping, the left and right motors are caused to generate a compensating torque that offsets the rotational force generated in the left and right driving wheels due to gravity acting on the vehicle body according to the inclination detected by the inclination sensor, and in that state, the electromagnetic brake is unlocked, and a walking assistance mode is executed in which the torque of the left and right motors is controlled in accordance with the rotation speed of the left and right driving wheels detected by the rotation speed sensor and a torque map; and
in a case in which the release switch is operated during stopping of the left and right motors, the electromagnetic brake is unlocked when the inclination being detected by the inclination sensor is less than a predetermined threshold value, and the operation of the release switch is disabled when the inclination is the predetermined threshold value or more, and
wherein, in a state in which the release switch is operated, power feeding to the left and right motors and driving circuits thereof is stopped.

2. The electric walking assisting vehicle according to claim 1, wherein the control unit is configured such that during forcibly releasing the electromagnetic brake by the forcible release, when the inclination being detected by the inclination sensor is the predetermined threshold value or more continuously for a predetermined period of time, the control unit sets the electromagnetic brake in a locked state.

3. The electric walking assisting vehicle according to claim 1, wherein the control unit is configured such that when each of the rotation speeds of the left and right driving wheels, being detected by the rotation speed sensors, is less than a predetermined threshold value, the control unit enables the forcible release and when during forcibly releasing the electromagnetic brake by the forcible release, each of the rotation speeds has reached an upper limit value, the control unit disables the forcible release and sets the electromagnetic brake in a locked state.

4. The electric walking assisting vehicle according to claim 1, wherein the vehicle body includes a foldable seat and an operation unit which is operable by the user seated on the seat, and the electric walking assisting vehicle is usable as a compact electric vehicle, and also in a form of the compact electric vehicle, the control unit is configured such that during stopping of the left and right motors, when an inclination being detected by the inclination sensor is less than the predetermined threshold value, the control unit enables the forcible release and when the inclination is the predetermined threshold value or more, the control unit disables the forcible release.

* * * * *